United States Patent [19]

Foreman et al.

[11] Patent Number: 5,274,066

[45] Date of Patent: Dec. 28, 1993

[54] GELLATION PROCESS FOR SILICONE VARNISH RESINS

[75] Inventors: James E. Foreman, Orlando; Dorinne J. Palmieri, St. Cloud, both of Fla.

[73] Assignee: Martin Marietta Corporation, Bethesda, Md.

[21] Appl. No.: 937,373

[22] Filed: Nov. 3, 1992

[51] Int. Cl.$^5$ .............................................. C08G 77/38
[52] U.S. Cl. ........................................ 528/28; 528/17; 528/25; 528/26; 528/33; 525/475
[58] Field of Search ....................... 528/17, 23, 25, 26, 528/28; 525/475

[56] References Cited

U.S. PATENT DOCUMENTS

| | | | |
|---|---|---|---|
| 3,294,739 | 12/1966 | Weyenberg | 528/17 |
| 3,779,986 | 12/1973 | Smith et al. | 528/17 |
| 4,032,686 | 6/1977 | Emmons . | |
| 4,182,827 | 1/1980 | Jones et al. . | |
| 4,184,031 | 1/1980 | Graham et al. . | |
| 4,322,327 | 3/1982 | Yoshimura et al. . | |
| 4,329,436 | 5/1982 | Dedolph . | |
| 4,373,057 | 2/1983 | Hammond . | |
| 4,390,679 | 6/1983 | Weiss et al. . | |
| 4,426,510 | 1/1984 | DelDonno . | |
| 4,552,919 | 11/1985 | Mikami et al. . | |
| 4,742,113 | 5/1988 | Gismondi et al. . | |

OTHER PUBLICATIONS

Concise Chemical and Technical Dictionary, Bennett, Ed. p. 579, 3rd ed., 1974.

*Primary Examiner*—Melvyn I. Marquis
*Attorney, Agent, or Firm*—Burns, Doane, Swecker & Mathis

[57] ABSTRACT

A process for the gelling of a silicone varnish comprises reacting the silicone varnish with an organic coupling agent, preferably an organometallic coupling agent under conditions which are effective and to provide a gel. This gel has a viscosity which is effective for suspending high density particles in the resin without settling of the particles during subsequent processing such as spraying, casting, and/or curing processes. The silicone varnish contains hydroxyl substituents, and is preferably a polyhydroxy substituted silicone varnish, i.e., silanols.

15 Claims, 1 Drawing Sheet

GELLATION PROCESS FOR SILICONE VARNISH RESINS

BACKGROUND OF THE INVENTION

The present invention relates to a process for making a silicone varnish resin system into a gel of suitable viscosity such that high density fillers can be suspended in the resin system without settling of the fillers during subsequent processing.

In the past, the art has employed diisocynates, such as methylene diphenyl diisocynate (MDI) which is illustrated below in a batch reactor environment for the gelling of silicone varnish resin systems.

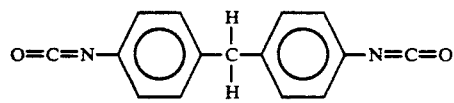

The gelling occurs via an adduction reaction such as that illustrated below.

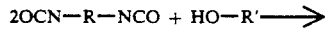

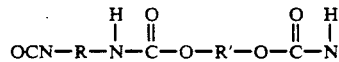

However, such an adduction reaction is subject to a number of disadvantages.

First of all, the reaction is not reproducible, i.e., there is a large variability in the amount of diisocynate which is required to obtain the desired degree of gellation. Furthermore, the reaction occurs slowly, e.g., the process can take as long as about 16 hours to occur at 150° F.

The diisocynates employed are also sensitive to many contaminants, e.g., the lead present in the solder joints of paint cans. Moreover, the toxicity of the diisocynate compounds also renders them undesirable from a health and safety standpoint.

Accordingly, a need exists for an alternative method of gelling a silicone varnish resin.

Thus, it is an object of the present invention in order to provide such an alternative gellation process.

This and further objects will become apparent from the specification and claims that follow.

SUMMARY OF THE INVENTION

In accordance with the foregoing objectives, the present invention relates to a process for gelling a silicone varnish having hydroxyl substituents which is capable of providing a gel having a suitable viscosity.

In particular, the process comprises reacting the silicon varnish with at least one organic coupling agent, preferably at least one organometallic coupling agent, under conditions which are effective to provide a gel having a viscosity which is effective in suspending high density particles in the resin without settling of the particles during subsequent processing such as spraying, casting and/or curing processes.

In another aspect, the invention relates to the gel formed by this process.

DETAILED DESCRIPTION OF THE PREFERRED EMBODIMENTS

Figure 1:
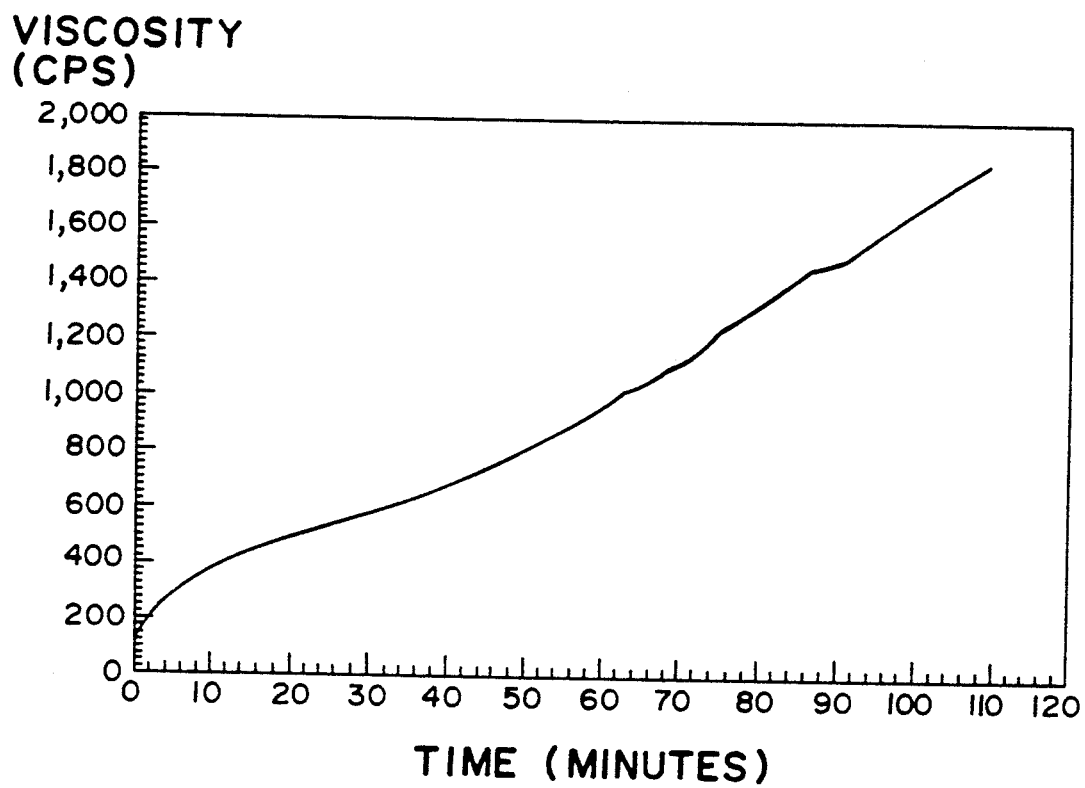
FIG. 1 is a graph which illustrates the change in viscosity of chemically modified silicone varnish i.e., DC-805, over time.

The process according to the present invention relates to the gellation of silicone varnishes. This process can be employed with any silicone varnish containing hydroxyl substituents. Preferred examples of such compositions include polyhydroxy substituted silicone varnishes (also called "silanols") such as those represented by the formula:

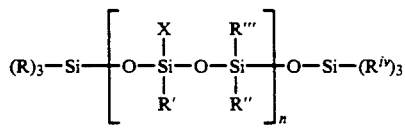

where X is OH, $CH_2OH$, $C_2H_5OH$, $C_3H_7OH$, $C_4H_9OH$, and the like and R, R', R", and R''' and $R^{iv}$ can be the same or different and represent those conventional side chains for such silicone compounds, e.g., olefinic and aromatic side chains, while n is selected from among those chain lengths associated with known silicone compounds, e.g., 1–1000. Specific examples of silicone varnishes which can be employed include DC-805, and DC-Q1-2529, DC-804, DC-806A, DC-808, DC-840 and DC-Q1-2530 which are produced by Dow Corning as well as the Truplus resins, TPR178 and TPR179, produced by General Electric.

More specifically, silicone varnishes such as DC-805 and DC-Q1-2529 are of a class of silicone resins that have polyhydroxy substituent groups attached. In such resins, the hydroxyl groups can be attached to organic substituents e.g., alkylhydroxy substituents, off of the main silicone chain or the hydroxyl groups can be directly bonded to the silicon atom(s).

Both the DC-805 and DC-Q1-2529 resin systems having a solids content of about 50% by weight. The DC-805 resin is thinned with, e.g., xylene while the Q1-2529 resin is thinned with a blend of toluene, VM&P naphtha and oxygenated solvents. The viscosity of both resin systems at 25 degrees centigrade is 115 cps.

Typically, materials of this class, when elevated to temperatures above 200 degrees centrigrade, self react via a condensation cure reaction to produce a higher molecular weight polymer (i.e., a solid). A byproduct of this condensation cure is the evolution of water and/or low molecular weight alcohol(s).

The organic coupling agent which is reacted with the silicone varnish can include any coupling agent which is effective in providing a gel having a suitable viscosity to suspend high density filler particles in the resin without settling during subsequent processing steps, such as, for example, spraying, casting, and/or curing.

Traditional high density fillers which can be suspended into the gel include carbonyl iron powder, titanium dioxide, titanate powders, alumina oxide, aluminum flake, silver powder, nickel powder, as well as numerous whiskers and fibers. These fillers can be suspended into the gel by any means recognized in the art, such as shaking, stirring, shear mixing, roll milling, or the like.

These preferred organometallic coupling agents include organozirconate coupling agents, for example, a zirconate coupling agent which contain a phosphate group adjacent to the zirconate heteroatom. The choice of a particular coupling agent can depend on the particular silicone varnish employed. Examples of suitable coupling agents include LZ-01, LZ-09, LZ-12, LZ-38, LZ-44, LZ-97, LICA-01, LICA-09, LICA-28, LICA-44 and LICA-97 developed by Kenrich Petrochemicals, Bayonne, N.J..

More specifically, these preferred compounds are:

LZ-12, a neoalkoxy zirconate coupling agent developed by Kenrich Petrochemicals Inc., Bayonne, N.J. The chemical name of this material using Chemical Abstracts Services (CAS) nomenclature is Zirconium IV 2,2(bis-2propenolatomethyl) butanolato, tris (dioctyl)phosphate-O. The materials a liquid with a specific gravity of 1.06 g/cm³ and a viscosity of 160 cps at 25 degrees centrigrade. The material is 95% solids in 5% isopropanol and has a saturated solution pH of 6.

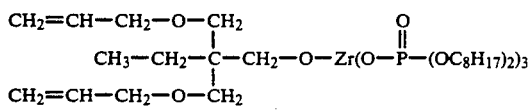

LZ-01, Zirconium IV 2,2(bis-2-propenolatomethyl) butanolato, tris neodecanolato-O.
LZ-09, Zirconium IV 2,2(bis-2-propenolatomethyl) butanolato, tris (dodecyl)benzenesulfonato-O.
LZ-38, Zirconium IV 2,2(bis-2-propenolatomethyl) butanolato, tris (dioctyl)pyrophosphato-O.
LZ-44, Zirconium IV 2,2(bis-2-propenolatomethyl) butanolato, tris (2-ethylenediamino) ethylato.
LZ-97, Zirconium IV 2,2(bis-2-propenolatomethyl) butanolato, tris (2-amino) phenylato.
LICA-01, Titanium IV 2,2(bis-2-propenolatomethyl) butanolato, tris neodecanolato-O.
LICA-09, Titanium IV 2,2(bis-2-propenolatomethyl) butanolato, tris (dodecyl)benzenesulfonato-0.
LICA-38, Titanium IV 2,2(bis-2-propenolatomethyl) butanolato, tris (dioctyl)pyrophosphato-O.
LICA-44, Titanium IV 2,2(bis-2-propenolatomethyl) butanolato, tris (2-ethylenediamino) ethylato.
LICA-97, Titanium IV 2,2(bis-2-propenolatomethyl) butanolato, tris (2-amino) phenylato.

On the other hand, the titanate analog of the LZ-12, e.g., LICA-12, as well as zirconate coupling agents which contain pyrophosphate and sulfonyl substituents have been found to be largely ineffective in providing the desired characteristics when employed with the DC-805 resin under the preferred conditions of the present invention. However, it should be noted that even those coupling agents which did not perform under the preferred reaction conditions may promote gellation is utilized at high enough concentrations or at elevated temperatures.

The process according to the present invention can be employed under any conditions effective in producing the desired gel. Preferably, the gellation process occurs at ambient temperatures and pressures. Moreover, at ambient temperatures, the desired viscosity can typically be obtained quickly, e.g., in about two hours.

The preferred process conditions for making, e.g., the DC-805 or Q1-2529, silicone resins into a gel is as follows. First, about 2% by weight of the coupling agent is added a desired quantity of silicone to resin. The mixture is agitated e.g., by shaking or stirring, for an effective amount of time to assure thorough mixing (e.g., 5 minutes). This mixture is then stored for a suitable period of time, e.g., about 2 hours at room temperature conditions for sufficient gellation to occur.

One aspect of the present invention relates to the use of coupling agents that have amino substituents. Such coupling agents include for example, LZ-44, LICA-44, LZ97, and LICA-97. When LZ-44 and LICA-44 are employed the coupling agent, the gellation reaction occurs almost instantaneously. Accordingly, such coupling agents are preferred when localized encasement of the coupling agent in a gelled portion of the resin is desired. In the alternative, a more uniform gel can be effectively obtained by more effectively distributing the coupling agent throughout the resin. This can be accomplished by way of any of these traditional techniques for uniformly distributing a compound throughout a material. For example, a solvent compatable with both the agents and the resin can be employed in order to lower the concentration of the coupling agent prior to addition to the silicone varnish.

In another aspect, where coupling agents, e.g., LZ-97 and LICA-97, which are largely insoluble in the resin are employed, a suitable solvent, i.e., a solvent which is compatible with both the coupling agent and the resin system, is employed to solubilize the coupling agent into the resin.

Although the reaction of the organometallic coupling agent with the silicone varnish to produce a gel at room temperature is not fully understood at the present time, the following hypothesized reaction mechanisms are possible explanations for the gellation effect which takes place:

1) The zirconium atom in conjunction with the phosphate ester moiety provides for an electron donor/acceptor reaction resulting in catalytic rearrangement and redistribution of the molecular structure and therefore molecular weight of the silicone varnish causing a gellation effect.

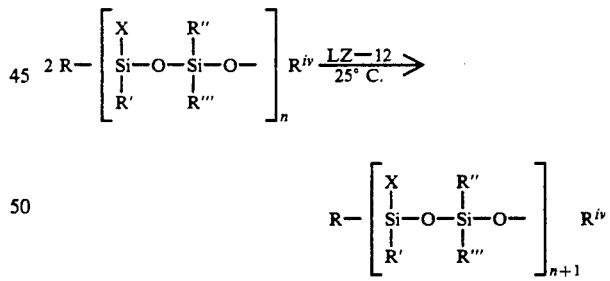

2) The zirconium atom provides for transesterification catalysis of the phosphate ester with the silanol to form a higher boiling silicone backbone ester and a low boiling alcohol.

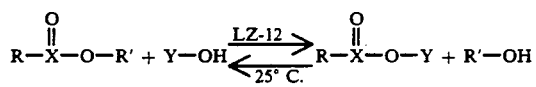

3) The zirconium atom acting as a dehydrating or drying agent on the silanol promotes polymerization and this reaction is catalytically accelerated by the proximity of the phosphate ester to the zirconium atom.

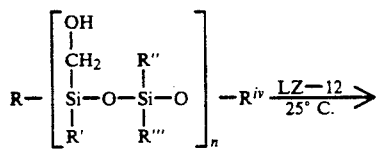

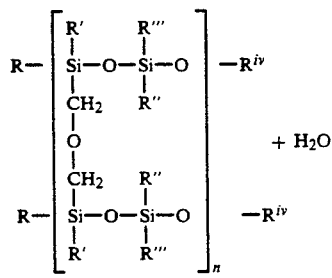

However, gelation does occur irrespective of the mechanism, and, thus, the present invention should not be bound by or limited to any particular mechanism.

The process according to the present invention has a number of advantages over the diisocyanate reaction employed in the prior art. In particular, the process of the present invention is not only faster at providing the gel but it is also reproducible, i.e., it can be reproduced from batch to batch.

Furthermore, because the coupling agent effectively acts as a "chemical bridge" between resins and fillers due to the nature of the organometallic functionality, it is more effective in preventing the settling of the high density particulates during subsequent processing.

The organometallic coupling agent is also much less sensitive to contaminants than the isocyanates as well as being less toxic than the isocyanates employed in conventional processes.

In order to further illustrate the present invention and the advantages that can be associated therewith, the following specific example is given, it being understood that same is intended solely as illustrative and in nowise limitive.

EXAMPLE

Coupling agent LZ-12 was added to silicone resin DC805 in an amount of 1.5% by weight based on the DC-805.

This mixture was then stirred for five minutes and then stored at room temperature. The increase of viscosity of DC-805 resin over time is illustrated by FIG. 1.

A viscosity measurement device utilized to obtain the data in FIG. 1 was a Brookfield Viscometer with a #63 spindle and a shear rate of 12 rpm. The representative experiment was performed at ambient temperatures and pressures.

While this invention has been described in terms of various preferred embodiments, the skilled artisan will appreciate the various modifications, substitutions, omissions, and changes may be made without departing from the spirit thereof. Accordingly, it is intended that the scope of the present invention be defined solely by the scope of the following claims including equivalents thereof.

We claim:

1. A process of gelling a silicone resin comprising reacting a silicone resin having the following formula:

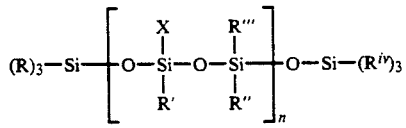

wherein n is 1-1000, X is a hydroxy or an alkylhydroxy group; and R, R', R'', R''', and $R^{iv}$ can be the same or different and each represent an aromatic side chain or a side chain containing ethylenic unsaturation; with at least one organometallic coupling agent to provide a gel.

2. The process according to claim 1 where the at least one organometallic coupling agent comprises a zirconate containing a phosphate group adjacent to a zirconate heteroatom.

3. The process according to claim 2 wherein the organometallic coupling agent further includes an amino substituent.

4. The process according to claim 1 wherein the coupling agent is added to the silicone varnish and the resulting mixture is mixed.

5. The process according to claim 4 wherein the process occurs at ambient temperatures.

6. The process according to claim 5 wherein the process occurs over a time period of about 2 hours.

7. The process according to claim 6 wherein the coupling agent is zirconium IV 2,2(bis-2-propenolatomethyl) butanolato, tris (dioctyl)phosphate-O; zirconium IV 2,2(bis-2-propenolatomethyl) butanolato, tris neodecanolato-O; zirconium IV 2,2(bis-2-propenolatomethyl) butanolato, tris (dodecyl)benzenesulfonato-O; zirconium IV 2,2-(bis-2-propenolatomethyl) butanolato, tris (dioctyl)pyrophosphato-O; zirconium IV 2,2(bis-2-propenolatomethyl) butanolato, tris(2-ethylenediamino) ethylato; zirconium IV 2,2-(bis-2-propenolatomethyl) butanolato, tris (2-amino) phenylato; titanium IV 2,2(bis-2-propenolatomethyl) butanolato, tris neodecanolato-O; titanium IV 2,2(bis-2-propenolatomethyl) butanolato, tris (dodecyl)benzenesulfonato-O; titanium IV 2,2(bis-2-propenolatomethyl) butanolato, tris (dioctyl)pyrophosphato-O; titanium IV 2,2(bis-2-propenolatomethyl) butanolato, tris (2-ethylenediamino) ethylato; titanium IV 2,2(bis-2-propenolatomethyl) butanolato, tris (2-amino) phenylato or mixtures thereof.

8. The process according to claim 6 wherein the coupling agent is zirconium IV 2,2(bis-2-propenolatomethyl) butanolato, tris (dioctyl)phosphate-O.

9. The process according to claim 6 wherein the at least one coupling agent is mixed with a solvent which is compatible with both the coupling agent and the silicone resin prior to adding the coupling agent to the resin.

10. The process according to claim 9 wherein the coupling agent is zirconium IV 2,2-(bis-2-propenolatomethyl) butanolato, tris (2-ethylenediamino) ethylato and/or titanium IV 2,2(bis-2-propenolatomethyl) butanolato, tris (2-ethylenediamino) ethylato.

11. The gel produced by the process according to claim 1.

12. The gel produced by the process according to claim 4.

13. The gel produced according to the process of claim 9.

14. The process according to claim 1 wherein the coupling agent is present in an amount effective to provide a gel having a viscosity which can suspend high density particles therein without settling of the particles during a subsequent spraying, casting, and/or curing process.

15. The process according to claim 1 wherein the coupling agent is present in an amount about 2% by weight based upon the silicone resin.

* * * * *